(12) United States Patent
Zapirain

(10) Patent No.: US 11,591,094 B2
(45) Date of Patent: Feb. 28, 2023

(54) SYSTEMS AND METHODS FOR PARACHUTE DEPLOYMENT

(71) Applicant: CIMSA Ingenieria de Sistemas, S.A., Las Franquesas del Valles (ES)

(72) Inventor: Jose Francisco Zapirain, La Roca del Valles (ES)

(73) Assignee: CIMSA Ingenieria de Sistemas, S.A., Las Franquesas (ES)

( * ) Notice: Subject to any disclaimer, the term of this patent is extended or adjusted under 35 U.S.C. 154(b) by 0 days.

(21) Appl. No.: 17/046,392

(22) PCT Filed: Apr. 10, 2019

(86) PCT No.: PCT/US2019/026861
§ 371 (c)(1),
(2) Date: Oct. 9, 2020

(87) PCT Pub. No.: WO2019/209540
PCT Pub. Date: Oct. 31, 2019

(65) Prior Publication Data
US 2021/0094691 A1 Apr. 1, 2021

Related U.S. Application Data

(60) Provisional application No. 62/655,810, filed on Apr. 10, 2018.

(51) Int. Cl.
*B64D 17/20* (2006.01)
*B64D 17/34* (2006.01)
*B64D 17/80* (2006.01)

(52) U.S. Cl.
CPC ........... *B64D 17/20* (2013.01); *B64D 17/343* (2013.01); *B64D 17/80* (2013.01)

(58) Field of Classification Search
CPC ...... B64D 17/18; B64D 17/20; B64D 17/343; B64D 17/80
See application file for complete search history.

(56) References Cited

U.S. PATENT DOCUMENTS 2,350,646 A * 6/1944 Smith .................. B64D 17/00
244/145
2,356,493 A * 8/1944 Smith .................. B64D 17/02
244/145

(Continued)

FOREIGN PATENT DOCUMENTS

FR 1267144 A 7/1961
GB 186460 A 10/1922

(Continued)

OTHER PUBLICATIONS

European Patent Office, Supplementary European Search Report for Application No. EP 19 79 3993, dated Nov. 18, 2021, Munich.

(Continued)

*Primary Examiner* — Tye William Abell
(74) *Attorney, Agent, or Firm* — Underwood & Associates, LLC

(57) ABSTRACT

A parachute vent reefing system is disclosed. The parachute vent reefing system includes a plurality of attachment members disposed about a vent portion of a parachute canopy and a keeper routed between each attachment member of said plurality of attachment members. The keeper has a diameter less than the diameter of the vent portion and is configured to break at a preselected tensile threshold.

16 Claims, 5 Drawing Sheets

(56) References Cited

U.S. PATENT DOCUMENTS

| | | | | |
|---|---|---|---|---|
| 2,577,047 A | * | 12/1951 | Taylor | B64D 17/20 |
| | | | | 244/145 |
| 2,577,048 A | | 12/1951 | Taylor | |
| 2,942,815 A | * | 6/1960 | Gross | B64D 17/00 |
| | | | | 244/142 |
| 3,193,222 A | * | 7/1965 | Davies | B64D 17/34 |
| | | | | 244/152 |
| 4,863,119 A | | 9/1989 | Case et al. | |
| 5,205,517 A | | 4/1993 | Reuter | |
| 5,360,187 A | | 11/1994 | Hengel | |
| 7,028,951 B1 | | 4/2006 | Sadeck | |
| 8,985,520 B1 | | 3/2015 | Sadeck | |
| 2018/0141667 A1 | * | 5/2018 | Vander Lind | B64D 17/20 |

FOREIGN PATENT DOCUMENTS

| | | | |
|---|---|---|---|
| GB | 562309 A | 6/1944 | |
| GB | 722442 A | 6/1955 | |

OTHER PUBLICATIONS

ISA/US, Commissioner for Patents, International Search Report for PCT/US19/26861; PO Box 1450, Alexandria, Virginia, 22313, USA.

ISA/US, Commissioner for Patents, Written Opinion of the International Searching Authority for PCT/US19/26861; PO Box 1450, Alexandria, Virginia, 22313, USA.

* cited by examiner

SYSTEMS AND METHODS FOR PARACHUTE DEPLOYMENT

CROSS REFERENCE TO RELATED APPLICATIONS

This application claims priority to and the benefit of International Application Serial No. PCT/US19/26861, filed on Apr. 10, 2019, which claims priority to U.S. Provisional Patent Application No. 62/655,810, filed on Apr. 10, 2018. The contents of both applications are hereby incorporated by reference in their entirety as if fully set forth herein.

TECHNICAL FIELD

This disclosure relates to systems and methods for parachute deployment. In particular, this disclosure relates to systems and methods for reefing a vent component of an aircraft emergency parachute for increasing deployment performance at low speeds.

BACKGROUND

Parachutes are used in some aircraft to mitigate emergencies such as structural or engine failure or pilot incapacitation. For example, Cirrus Aircraft airframes employ a pilot-activated, rocket-propelled emergency parachute system to control the rate of decent of an incapacitated aircraft. Parachute deployment speed can be a critical survival factor during in-air emergencies for aircraft employing a parachute-deployment system.

The 'opening time' of a parachute, that is, the time it takes for a parachute canopy to fully inflate can depend on many factors, such as the forward velocity of the object carrying the parachute assembly, the air flux balance between air entering the canopy skirt and the air leaving the canopy through the vent, the way in which the parachute is packed and whether an assist device such as a rocket is used to increase extraction speed. In some cases, parachutes include vent portions near the top of the canopy that allow air movement therethrough. The vent portion can provide stability during decent among other performance factors.

U.S. Pat. No. 4,863,119 to BRS, Inc. describes a parachute reefing system including an annular flexible membrane having a centrally located vent opening and a plurality of guides symmetrically spaced around the periphery of the membrane. The reefing system retards or slows opening of the canopy of a parachute in order to reduce the shock normally encountered with parachutes. In essence, the annular ring constricts the canopy lines during deployment so that the canopy opens gradually instead of explosively.

SUMMARY

In one illustrative aspect, a system for reefing a vent portion of a parachute canopy during deployment is disclosed. In one embodiment, such a system includes a plurality of attachment articles circumferentially disposed about a vent portion of a parachute canopy. A keeper is routed through or to the plurality of attachment articles such that the effective size of the vent portion is reduced from its normal, operative configuration. In one embodiment, the keeper is configured to break or release at a predefined tensile threshold.

In a related illustrative aspect, a method for reefing a vent portion of a parachute canopy is disclosed. In one embodiment, such a method includes disposing a plurality of attachment members in circumferential order about a vent portion of a parachute canopy.

The method further includes routing a keeper through or to the plurality of attachment members such that the effective size of the vent portion is reduced from its normal, operative configuration. In one embodiment, the keeper is configured to break or release at a predefined tensile threshold.

In one exemplary aspect, a parachute vent reefing system is disclosed. The parachute vent reefing system includes a plurality of attachment members disposed about a vent portion of a parachute canopy and a keeper routed between each attachment member of the plurality of attachment members. The keeper has a diameter less than the diameter of the vent portion and is configured to break at a preselected tensile threshold.

In one embodiment, the keeper is a break cord. The break cord can be composed of rope, cable, chain or wire in various alternative embodiments.

In one embodiment, the parachute vent reefing system further includes, for each one of the plurality of attachment members, a vent line extending from a top portion of the parachute canopy to a center portion of the vent portion. Each one of the plurality of attachment members can be attached to each other in the center portion of the vent portion. The plurality of attachment members can each includes a vent line extending from a circumferential edge of the vent portion. In one embodiment, each of the vent lines terminates in a loop. The vent line can be comprised of parachute tape. When the break cord is broken during parachute deployment, the parachute deploys to an un-reefed configuration.

In one exemplary aspect, a parachute vent reefing system includes a parachute canopy having a vent disposed on a top portion having an un-reefed diameter and a reefed diameter, at least two vent lines extending from opposite sides of the vent that extend toward a middle of the vent, an attachment member disposed on each of the vent lines and a break cord routed through each of the attachment members. When the break cord is routed through each of the attachment members, the vent assumes the reefed diameter, and when the break cord is not routed through each of the attachment members, the vent assumes the un-reefed diameter.

In one embodiment, the break cord is configured to break at a preselected tensile strength so that the vent can transition from the reefed diameter to the un-reefed diameter during parachute deployment.

In one embodiment, terminal end portions of the vent lines are joined to each other in the middle of the vent. In one embodiment, the attachment member is an O-ring or a D-ring. In an alternative embodiment, the attachment member is a loop formed at a terminal end portion of the vent line.

In one embodiment, the break cord is configured to break during parachute deployment of an aircraft traveling at a speed between about 35 knots and about 50 knots.

In another exemplary aspect, a method of reefing a parachute includes providing a parachute canopy portion having a vent aperture, the vent aperture having a circumferential edge; extending one or more vent lines from the circumferential edge of the vent aperture toward a center portion of the vent aperture; providing an attachment member on each of the vent lines within the vent aperture; and routing a break cord through each of the attachment members.

In one embodiment, the break cord is selected according to a selected tensile strength, so that when the parachute canopy deploys, outward radial forces imparted on the break cord via the attachment members breaks the break cord when the tensile strength is exceeded.

Certain advantages of the systems and methods will be evident from the present disclosure. Among those include a stable airframe emergency parachute that is capable of increased deployment rate at low airspeed, while maintaining deployment rates at higher airspeeds.

Unless otherwise defined, all technical and scientific terms used herein have the same meaning as commonly understood by one of ordinary skill in the art. Although methods and materials similar or equivalent to those described herein can be used in the practice or testing of any described embodiment, suitable methods and materials are described below. In addition, the materials, methods, and examples are illustrative only and not intended to be limiting. In case of conflict with terms used in the art, the present specification, including definitions, will control.

The foregoing summary is illustrative only and is not intended to be in any way limiting. In addition to the illustrative aspects, embodiments, and features described above, further aspects, embodiments, and features will become apparent by reference to the drawings and the following detailed description and claims.

DESCRIPTION OF DRAWINGS

The present embodiments are illustrated by way of the figures of the accompanying drawings, which may not necessarily be to scale, in which like references indicate similar elements, and in which.

DETAILED DESCRIPTION OF ILLUSTRATIVE EMBODIMENTS

"Round" style parachutes often include a vent portion disposed at the top of the canopy that allows air movement therethrough. Air movement through the vent can provide parachute stability during descent and, in some cases, depending on the design of the parachute, can provide some directional control. For aircraft equipped with an emergency parachute, deployment at high speeds can induce significant shock to an airframe which may cause structural damage or injury to passengers if the parachute is not vented. In some cases, the canopy vent can reduce the amount of shock imparted to the airframe during parachute deployment by allowing a portion of the canopy pressure to be released.

During low-speed deployments however, a parachute vent can increase opening time with perilous consequences. For example, if an aircraft is low to the ground, such as during takeoff or landing, the parachute may not fully inflate in time to provide its intended effect.

In one exemplary aspect, a vent reefing system for parachutes is disclosed. In general, the vent reefing system is configured to reduce the effective size of a canopy vent for a controllable amount of time during parachute opening. Reducing the effective size of the canopy vent—i.e., the area through which air passes—can increase the rate of parachute deployment in low speed conditions by allowing more air to be caught by the parachute canopy. However, as described herein, using the same packing and deployment configuration, the vent reefing system also allows provides for unreefed operation during high-speed deployments. As used herein, parachute "deployment" refers to the process of parachute canopy inflation and opening.

Figure 1:
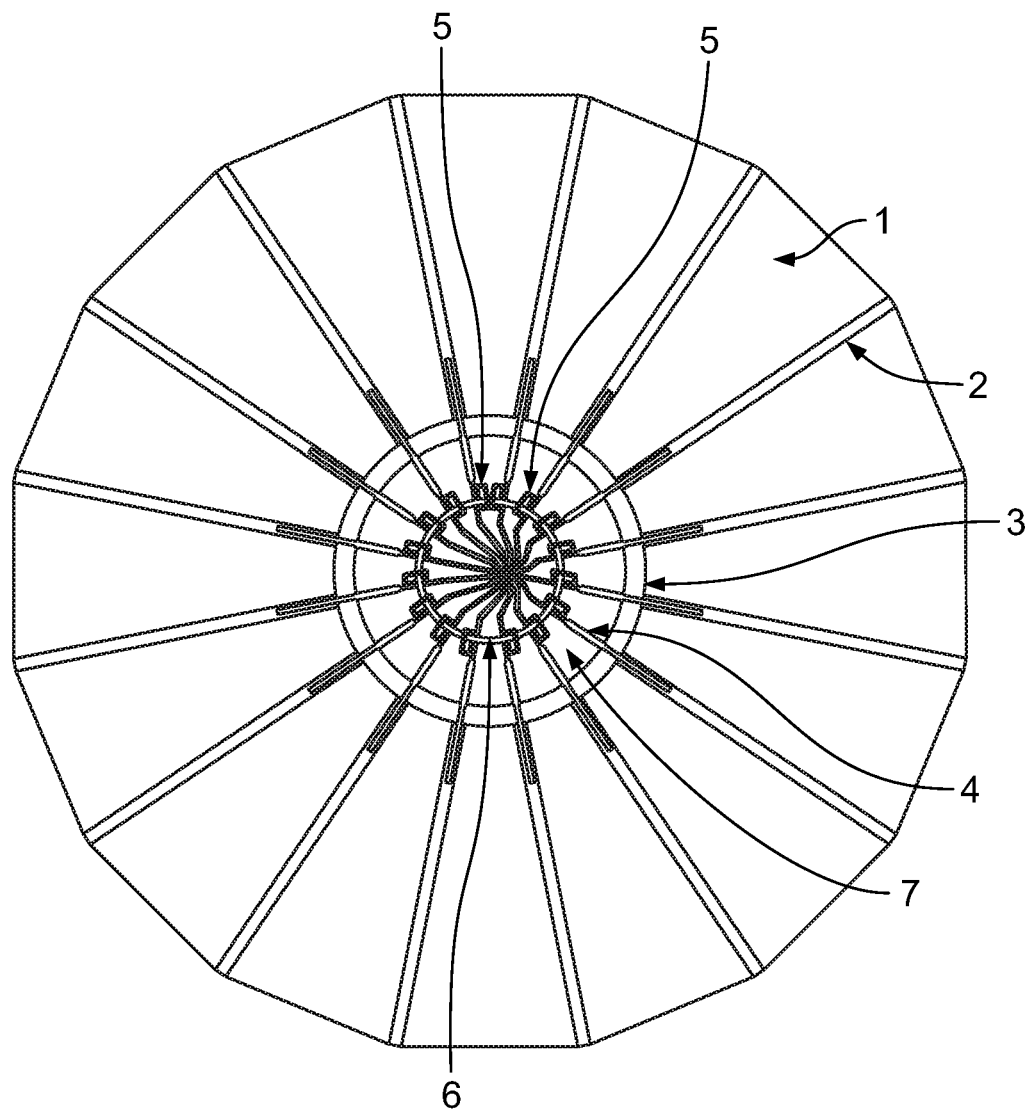
FIG. 1 shows a vent portion of a parachute canopy showing a vent reefing system according to one embodiment, wherein the vent is in a restricted configuration.
Figure 2:
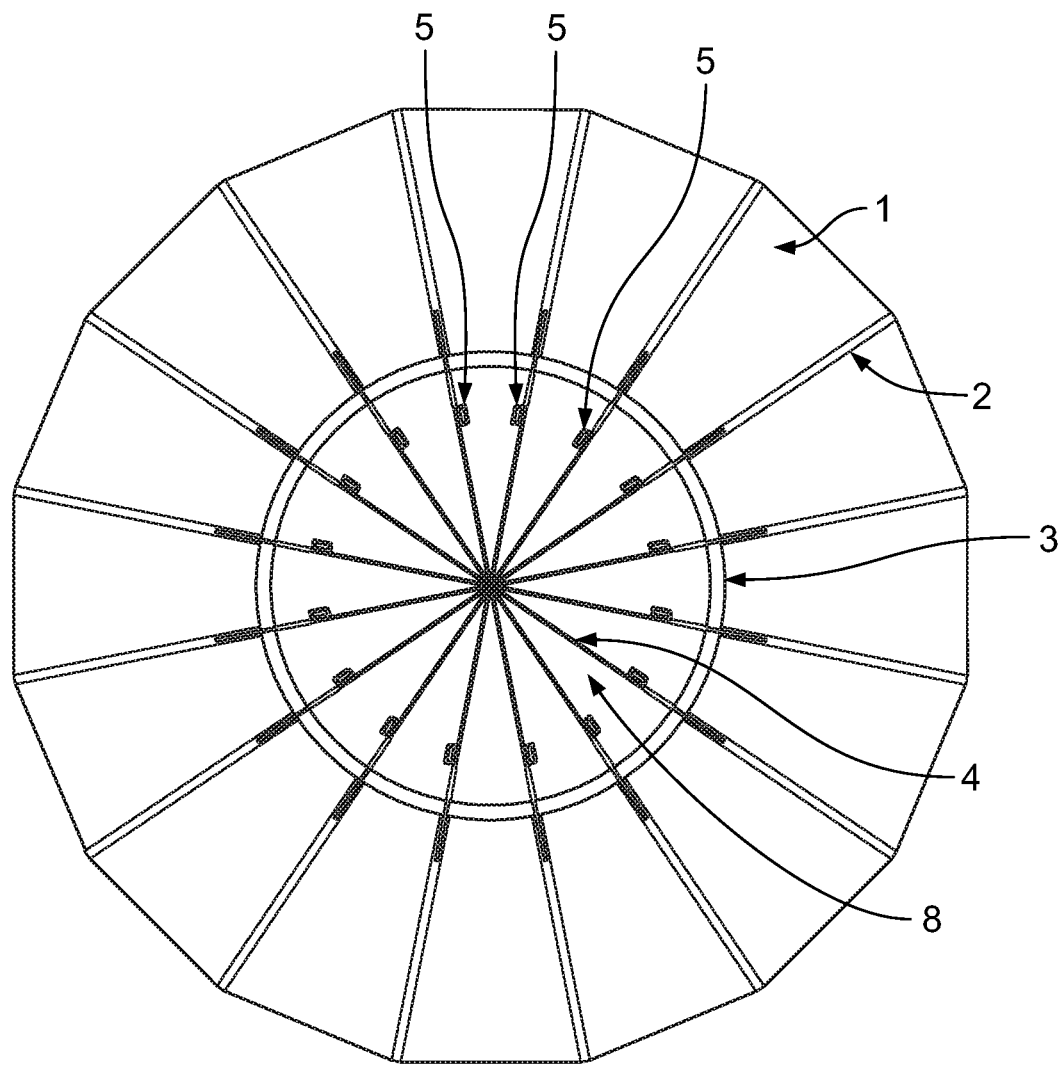
FIG. 2 shows the vent portion of the parachute canopy shown in FIG. 1, wherein the vent is in an unrestricted configuration.

Referring now to FIGS. 1 and 2, a vent reefing system 100 is illustrated according to one embodiment. FIGS. 1 and 2 illustrate a top plan view of a canopy 1 having a plurality of canopy radial reinforcement tape sections 2 and a circumferential reinforcement tape section 3. The circumference of tape section 3 defines the size of the parachute vent which, as described herein, is smaller in a packed-parachute configuration (e.g., FIG. 1) and larger in a deployed-parachute configuration (e.g., FIG. 2). The canopy further includes a plurality of vent lines 4. FIG. 1 illustrates the vent in a reduced vent size configuration 7 and FIG. 2 illustrates the vent in an unrestricted vent size configuration 8.

Figure 3:
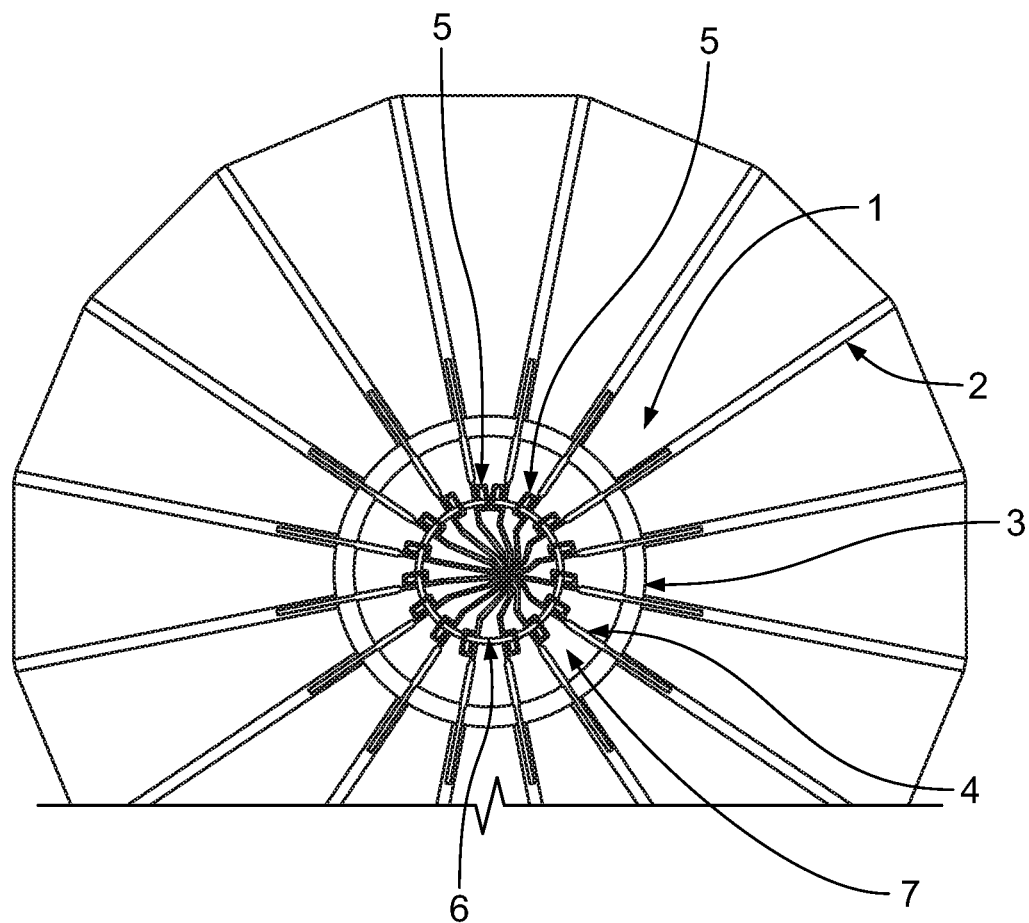
FIG. 3 is a magnified view of the vent reefing system shown in FIG. 1.

FIG. 3 is a magnified view of the vent reefing system 100 to highlight certain details. In this embodiment, the vent reefing system 100 includes a plurality of attachment members, in this example, a plurality of auxiliary loops 5 disposed circumferentially around the perimeter of the parachute vent on each of the vent lines 4. In various embodiments, each auxiliary loop 5 can alternatively be disposed on the vent reinforcement tape 3, the radial reinforcement tape 2, or other desired location.

In this embodiment, a break cord 6, which acts as a keeper to keep the vent in a restricted configuration as shown in FIGS. 1 and 3, is routed through each of the auxiliary loops 5. As described in greater detail below, the purpose of the break cord 6 is to keep the vent in a restricted configuration unless or until, during parachute deployment, the air pressure within the deploying parachute exerts adequate outward radial force via auxiliary loops 5 to break the break cord 6. At that time, the vent is allowed to expand to an unrestricted configuration as shown, e.g., in FIG. 2. In this example, the length of the break cord 6 is such that its diameter when routed through the auxiliary loops 5 is less than the diameter of the canopy vent. In other words, break cord 6 constricts the vent opening so that it is reefed in a pre-deployed parachute configuration. This configuration reduces the vent size of the parachute, consequently increasing the pressure within the parachute and increasing the rate of full deployment.

In this embodiment, break cord 6 is a cord having a defined and pre-selected tensile strength for its intended application. Break cord 6 is selected and/or configured to break, thereby allowing the vent portion to expand to its normal size, at or above a selected threshold of force exerted on the break cord 6 by the auxiliary loops 5 during parachute deployment.

The vent reefing system 100 may be installed and utilized in various types and sizes of aircraft as part of a parachute safety system that deploys or is deployed in the event of an emergency such as engine failure, collision or structural failure. In some cases, smaller aircraft may utilize a break cord 6 having a lesser tensile strength than a break cord 6 for larger aircraft.

In this embodiment, by reefing the vent portion of the canopy 1, the amount of air passing through the vent is reduced, which can increase the canopy deployment rate at both low and high airspeeds. As stated above, deploying an aircraft parachute at high airspeeds can lead to structural damage and injuries to passengers; however, because the break cord 6 is configured to break above a preselected force threshold, the reefing system 100 reduces the opening shock that would be imparted if the vent portion was always restricted or not present.

In this and other embodiments, break cord 6 can be configured to break corresponding to certain preselected conditions, e.g., when the canopy is fully inflated, when the parachute is deployed at or above a certain aircraft velocity or a combination thereof. Accordingly, the vent reefing system is effective to increase the initial inflation of the canopy of a parachute without affecting the opening stages which follow, especially at lower airspeeds, while maintaining a primary purpose of the vent, which is to increase stability of the parachute and reduce the likelihood of opening shock associated with high-speed deployments.

In one non-limiting embodiment, break cord 6 is configured to break, so as to un-reef the vent when the parachute is deployed at aircraft speeds at or greater than about 35 knots. In another non-limiting embodiment, break cord 6 is configured to break, so as to un-reef the vent when the parachute is deployed at aircraft speeds at or greater than about 50 knots. In general, break cord 6 can be configured to break, so as to un-reef the vent, at any desired deployment airspeed. Such functionality can be accomplished by, for example, and without limitation, selecting a break cord material having a tensile strength that is less than the outwardly-radial forces of the vent lines (and thereby the auxiliary loops) as the parachute deploys and catches air within the canopy. Tensile strength can be a function of break line 6 thickness, material composition, conformation or other factors. In various embodiments, break line 6 can be formed of rope, cable, chain, wire or other materials.

Figure 4:
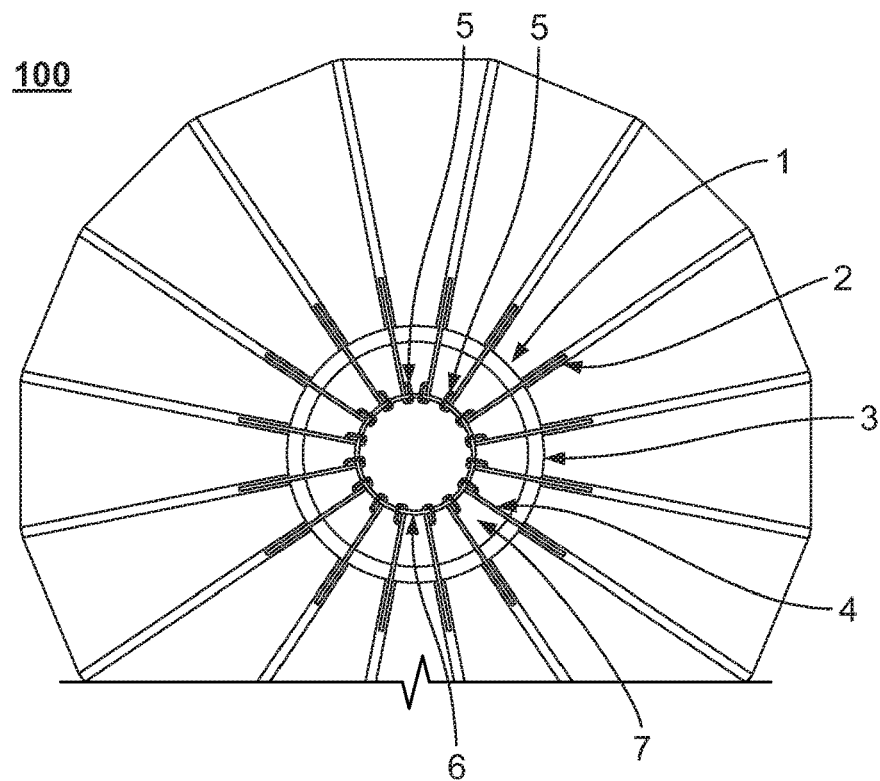
FIG. 4 shows an alternative embodiment of a vent reefing system in a restricted configuration.
Figure 5:
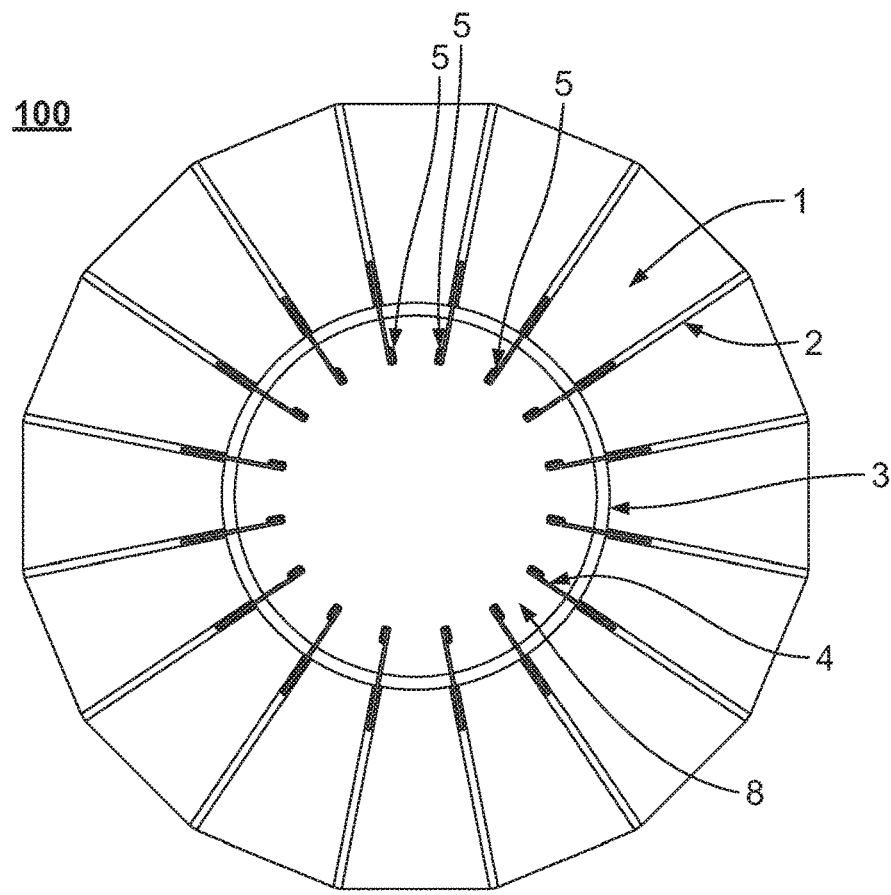
FIG. 5 shows the vent reefing system of FIG. 4 in an unrestricted configuration.

Referring now to FIGS. 4 and 5, in one alternative embodiment, vent lines 4 can be shorter in length than those shown in FIGS. 1-3, wherein the vent lines 4 are connected at the center of the vent. In FIGS. 4 and 5, each of the vent lines 4 can extend to, and terminate break at break cord 6. In such an embodiment, when the parachute is fully deployed as in FIG. 5, the vent lines are not attached to each other as in FIGS. 1-3. In the embodiment of FIGS. 4-5, auxiliary loops 5 can be looped at the terminal end portions (the end portions within the vent space) so that break cord 6 can be routed therethrough.

Figure 6:
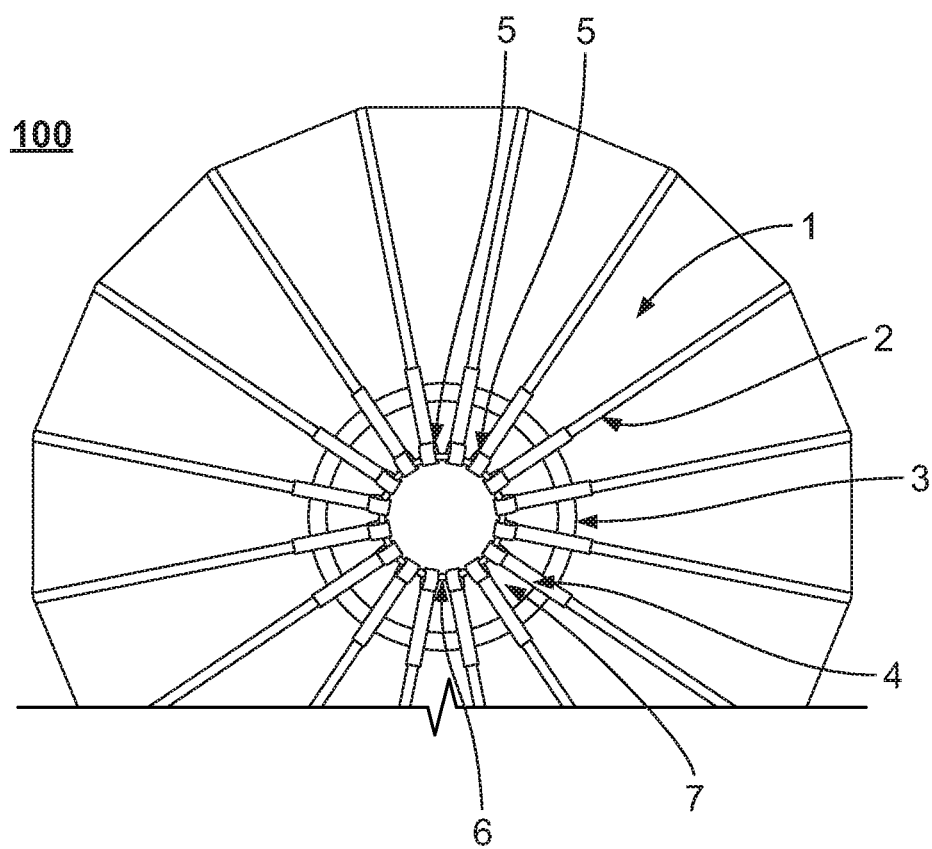
FIG. 6 shows a magnified view of an alternative embodiment of a vent reefing system.

In another alternative embodiment, referring to FIG. 6, vent lines 4 can be lengths of parachute tape having looped end portions (the end portions within the vent space).

A number of illustrative embodiments have been described. Nevertheless, it will be understood that various modifications may be made without departing from the spirit and scope of the various embodiments presented herein. For example, as an alternative to the plurality of auxiliary loops and a break cord routed therethrough, a length of strapping can be stitched to the circumference of the vent in a similar fashion to reef the vent prior to and during deployment, wherein the strapping and stitching are selected and performed such that the stitching breaks at or above a preselected threshold of radial forces imparted thereto during deployment. A vent reefing system of the type described herein can be used with any type of aircraft, including manned and unmanned aircraft, cargo parachutes, etc. Release members can include other, alternative arrangement and configurations to the break cord. Accordingly, other embodiments are within the scope of the following claims.

What is claimed is:

1. A parachute vent reefing system, comprising:
    a plurality of vent lines circumferentially disposed about a vent ring of a parachute canopy, wherein each vent line is individually connected to said parachute canopy at a proximal end, and each distal end of each vent line is connected to each other at a center of said vent ring;
    an attachment member connected to each of said vent lines between the proximal and distal ends thereof, each attachment member being disposed within said vent ring inwardly and distal from a circumferential border of said vent ring; and
    a keeper routed through each attachment member wherein said keeper has a diameter less than the diameter of said vent ring and is configured to break at a preselected tensile threshold.

2. The parachute vent reefing system of claim 1, wherein, when said break cord is broken during parachute deployment, the parachute deploys to an un-reefed configuration.

3. The parachute vent reefing system of claim 1, wherein said plurality of attachment members each comprises a vent line extending from beyond a circumferential edge of said vent portion.

4. The parachute vent reefing system of claim 3, wherein each of said vent lines terminates in a loop.

5. The parachute vent reefing system of claim 3, wherein said vent line is comprised of parachute tape.

6. The parachute vent reefing system of claim 1, wherein said keeper is a break cord.

7. The parachute vent reefing system of claim 6, wherein said break cord is composed of rope.

8. The parachute vent reefing system of claim 6, wherein said break cord is composed of cable.

9. The parachute vent reefing system of claim 6, wherein said break cored is composed of chain.

10. The parachute vent reefing system of claim 6, wherein said break cord is composed of wire.

11. A parachute vent reefing system, comprising:
    a parachute canopy having a vent disposed on a top portion, said vent having an un-reefed diameter and a reefed diameter;
    at least two vent lines extending from opposite sides of said vent that extend toward, and are attached to each other at a center of said vent; and
    an attachment member disposed on each of said vent lines between a proximal and a distal end of said vent lines that is offset from a circumferential border of said vent; and
    a break cord routed through each of said attachment members;
    wherein when said break cord is routed through each of said attachment members, said vent assumes said reefed diameter; and
    wherein when said break cord is not routed through each of said attachment members, said vent assumes said un-reefed diameter.

12. The parachute vent reefing system of claim 11, wherein said break cord is configured to break at a preselected tensile strength so that the vent can transition from said reefed diameter to said un-reefed diameter during parachute deployment.

13. The parachute vent reefing system of claim 11, wherein said attachment member is an O-ring or a D-ring.

14. The parachute vent reefing system of claim 11, wherein said break cord is configured to break during parachute deployment of an aircraft traveling at a speed between 32 and 55 knots.

15. A method of reefing a parachute, comprising:

providing a parachute canopy portion having a vent aperture, the vent aperture having a circumferential edge;

extending one or more vent lines from said circumferential edge of said vent aperture toward a center portion of said vent aperture;

providing an attachment member on each of said vent lines between a proximal and a terminal end thereof, said attachment member at a position that is separate from, and distal to said circumferential edge of said vent aperture; and routing a break cord through each of said attachment members;

wherein said terminal end portions of said vent lines are joined to each other in said middle of said vent.

16. The method of claim 15, wherein said break cord is selected according to a selected tensile strength, so that when said parachute canopy deploys, outward radial forces imparted on said break cord via said attachment members breaks said break cord when said tensile strength is exceeded.

* * * * *